Figure 1:
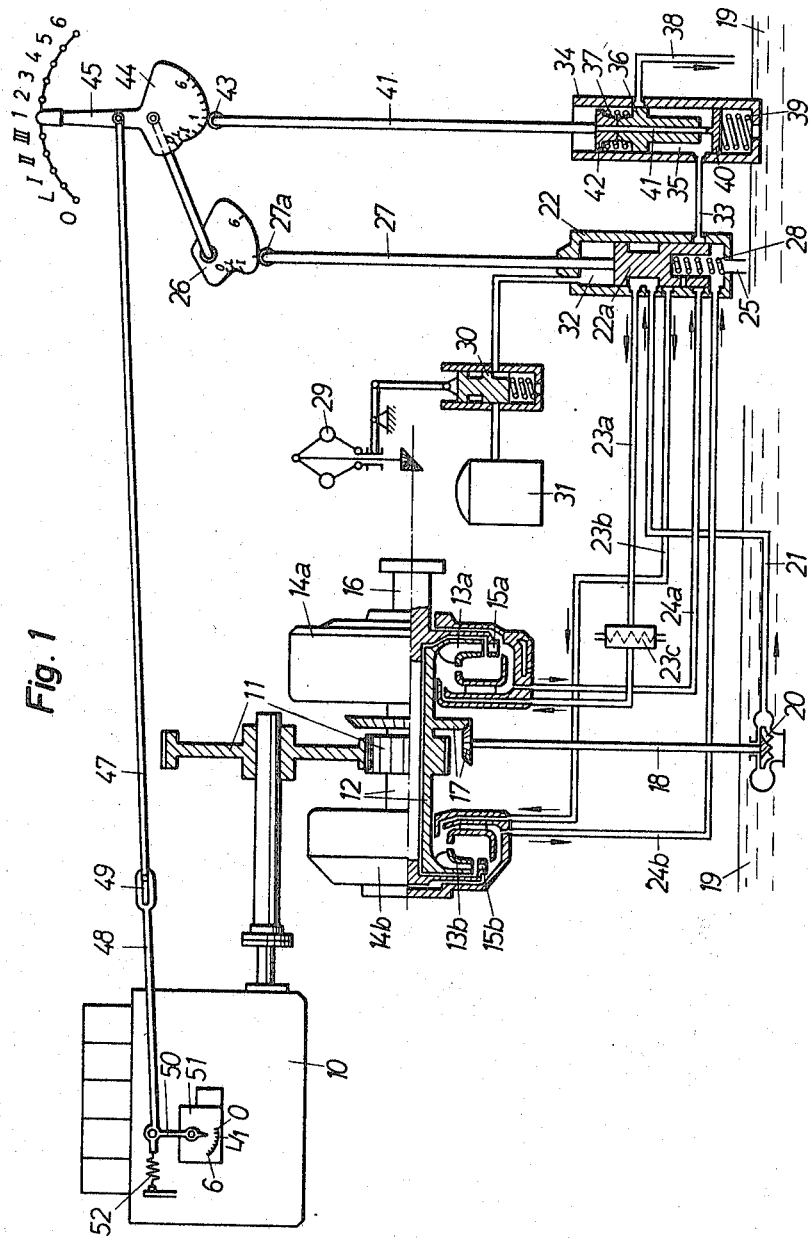

June 13, 1967 G. STAUDENMAIER 3,324,650
APPARATUS FOR CONTROLLING AN INSTALLATION WITH DRIVE
MOTOR AND A HYDRODYNAMIC TRANSMISSION, ESPECIALLY
FOR RAIL VEHICLES WITH DIESEL ENGINE
Filed Sept. 23, 1965 2 Sheets-Sheet 1

United States Patent Office 3,324,650
Patented June 13, 1967

3,324,650
APPARATUS FOR CONTROLLING AN INSTALLATION WITH DRIVE MOTOR AND A HYDRODYNAMIC TRANSMISSION, ESPECIALLY FOR RAIL VEHICLES WITH DIESEL ENGINE
Gerhard Staudenmaier, Heidenheim (Brenz), Germany, assignor to Voith Getriebe KG, Heidenheim (Brenz), Germany
Filed Sept. 23, 1965, Ser. No. 489,484
Claims priority, application Germany, Sept. 26, 1964, V 26,861
9 Claims. (Cl. 60—12)

The present invention relates to an arrangement for controlling an installation comprising a drive motor which is variable to a limited extent only, and also comprising a hydrodynamic transmission, especially for rail vehicles equipped with a diesel engine.

With rail vehicles, driving arrangements have proved effective which, in addition to being equipped with a drive motor, especially internal combustion engine variable within certain limits, also comprise a hydraulic transmission with one or more torque converters while the power variation is effected merely by varying the motor speed. The torque converter or converters absorb a power which is proportional to the third power of the motor speed and thus, with the exception of a device for completely filling and emptying the torque converter or converters, do not require additional complicated control devices such as variable pitch blades, annular slides, or the like. In other words, for this purpose, simple and relatively inexpensive torque converter constructions can be employed which are safe in operation.

Nevertheless, with drives of the above-identified type, certain difficulties may occur because the speed of an internal combustion engine, which sometimes is rather high, can be controlled in downward direction only up to its idling speed. At such idling speed, the torque converter then absorbs only such power that an operation with very low pulling forces at low driving speeds as are required for switching operations, cannot be realized without difficulties. This deficiency makes itself particularly felt when diesel engines are employed as driving engines because the idling speed of diesel engines is approximately 40% of the maximum speed of the engine, and this corresponds to a minimum power absorbed by the torque converter of 6.4% of the full engine power. This lower power limit is, particularly with drives of high power, still too high for a proper switching operation. Similar difficulties are also encountered when employing other driving engines which are variable as to speed within rather narrow limits.

In an effort to overcome the above-mentioned difficulties, driving arrangements of the above-mentioned type have been equipped with a control device according to which said control device, when adjusted for small outputs down to zero, will retain the engine at a low speed, especially at its idling speed, while at the same time said control device is able to control the over-pressure and especially also the degree of filling in the torque converter at values lower than the full value pertaining thereto, while, when the device is adjusted for all higher outputs, the engine is held by said device at medium and high speeds. In this way, it is possible to obtain very low power outputs which are below the power output at the idling speed of the engine. This can be realized without high costs. The changing of the over-pressure and the degree of filling in the torque converter with arrangements of the above-mentioned type has heretofore been realized by a so-called "cross-section control" according to which the power control member of the installation, for instance the driving crank of a self-propelled rail vehicle, is adjusted so as to directly increase or decrease the cross-section of a control piston at the inlet or outlet conduit respectively of the torque converter.

This cross-section control represents a considerable advance over heretofore known devices of the type involved but still has an undesired side effect inasmuch as the output torque increases very irregularly in response to the adjusting stroke of the control piston. Thus, a control piston stroke of 10 millimeters corresponds to an output torque of from 0 to 30% (with regard to the output torque at maximum torque converter filling), whereas the far greater output torque in the range of from 30 to 100% corresponds to a control piston stroke of approximately 0.8 millimeter only. As a result of this situation, definite output torques can be adjusted only under difficulties within the last-mentioned very important range of the output torque.

A further drawback of the last-mentioned arrangement consists in that, in spite of maintaining the cross-sectional adjustment, there will at the inlet conduit of the converter shortly after braking the output shaft to a standstill, be obtained an output torque which is considerably less than that at the instant of braking said output shaft to a standstill.

It is, therefore, an object of the present invention to provide an arrangement for controlling a driving installation equipped with a driving engine which is variable in relatively narrow limits only, and is also equipped with a hydrodynamic transmission, especially for rail vehicles with a diesel engine, which will overcome the above-mentioned drawbacks.

It is another object of this invention to provide an arrangement as set forth in the preceding paragraph, which, over the entire switching range, will permit a continuous control of low output torques.

Still another object of this invention consists in the provision of an arrangement as outlined in the preceding paragraphs in which, with the output shaft braked to a standstill and with one and the same position of the power control member, the output torque will be maintained constant.

Figure 2:
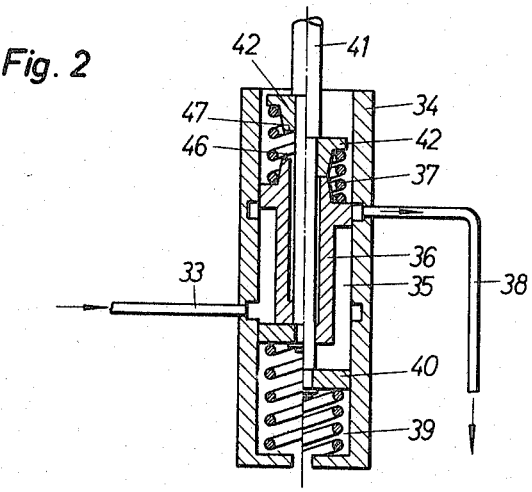
Figure 3:
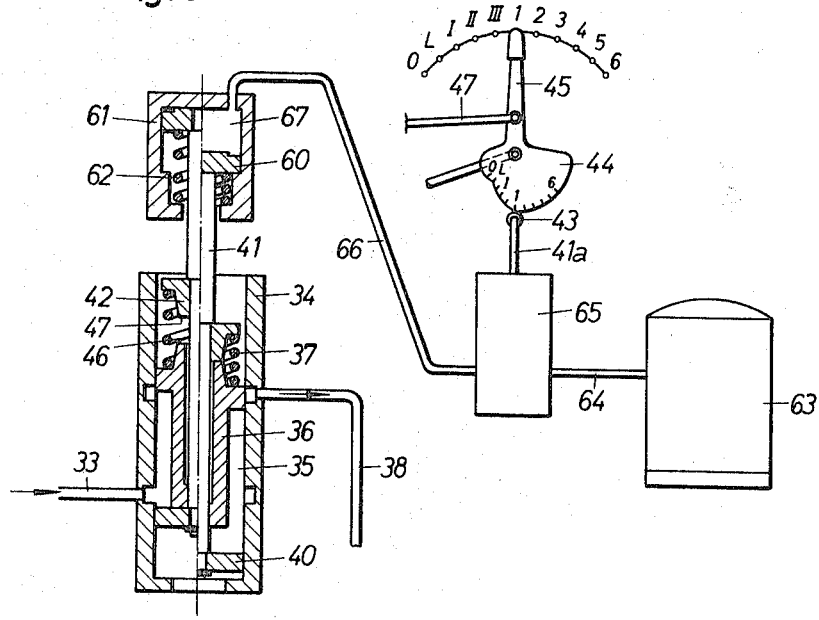

These and other objects and advantages of the invention will appear more clearly from the following specification in connection with the accompanying drawings, in which:

FIGURE 1 diagrammatically illustrates a driving installation according to the present invention for a self-propelled vehicle equipped with a variable diesel engine and with a torque converter having two converter speed ranges, and with a control device according to the present invention;

FIGURE 2 shows a relief valve for use in connection with the present invention, but on a larger scale than that of FIGURE 1;

FIGURE 3 diagrammatically illustrates, partly in section, a modified control arrangement according to the present invention.

The arrangement according to the present invention is characterized primarily in that in a torque converter outlet conduit there is provided a relief valve which opens in response to a converter over-pressure and then frees the outlet conduit. The arrangement according to the present invention is furthermore characterized in that the opening pressure for said relief valve is adjustable by the power control member, for instance, the driving lever of the installation, to the respective desired torque converter over-pressure.

If the torque converter is already equipped with a discharge conduit adapted to empty the converter so as to make the same ineffective, and to this end is equipped with a shut-off valve as, for instance, a control valve, the check valve may, for purposes of simplicity, be connected to such discharge conduit. In the last-mentioned instance, it is advisable to design the check valve and the shut-off valve as individual units. This is advisable particularly when the driving installation has a plurality of torque converters and has such a shut-off valve which serves for shutting off the discharge conduits as well as the inlet or filling conduits of the torque converter circuit or circuits. This structural separation of check valve on one hand, and shut-off valve on the other hand, which latter may also be designated as main control valve, while requiring a slight increase in costs, has considerable advantages of operation, for instance with regard to the cooling of the torque converter.

It is also advantageous to equip the check valve in a manner known per se with a spring which determines the opening pressure of the check valve, and to make the preload of said spring adjustable in conformity with the position of the power control member, for instance, of the driving lever. This yields a particularly simple device because the power control member will then have to be connected to the adjustable support of the check valve spring by a simple linkage only.

Referring now to the drawing in detail, the driving arrangement illustrated therein for a self-propelled rail vehicle comprises a variable diesel engine 10 adapted through the intervention of a stepup gear transmission 11 and a primary shaft 12 to drive the pumping wheels 13a, 13b of two torque converters 14a, 14b of a hydrodynamic transmission. The said torque converters 14a, 14b are adapted selectively to be made effective and ineffective by respectively filling and emptying the same with and of a fluid. The fluid filled torque converter will then convey its power through turbine wheels 15a and 15b respectively to the transmission output shaft 16 (secondary shaft) from where the power is further conveyed to the driving wheels (not shown) of the self-propelled vehicle. As will be seen from the drawing, primary shaft 12 is through bevel gear transmission 17 and shaft 18 operatively connected to an oil pump 20 arranged in the oil reservoir 19 of the transmission. The oil delivered by pump 20 passes through a pressure conduit 21, a main control valve 22, and depending on the position of the valve spool 22a pertaining to valve 22 through filling conduit 23a or 23b into the working chamber of torque converter 14a or 14b respectively. Torque converters 14a and 14b are adapted to be emptied through discharge conduits 24a, 24b, main control valve 22 and conduit 25 into oil reservoir 19.

In the particular position shown in the drawings, valve spool 22a has by means of control lever 45, control cam 26, roller 27a, and control rod 27 been moved against the thrust of a spring 28 from its uppermost position to its intermediate position, control lever 45 being operable by the operator. In this intermediate position, valve spool 22a establishes communication between the pump pressure conduit 21 and the filling conduit 23a of torque converter 14a which serves for starting the movement of the self-propelled vehicle. At the same time, valve spool 22a closes discharge conduit 24a of converter 14a so that the latter will be maintained in its effective condition (lower torque converter speed or starting speed). The shift-over to the other converter speed—converter 14b—is effected automatically when a certain driving speed has been reached. More specifically, when said certain driving speed has been reached, the centrifugal governor 29 driven by the output shaft 16 displaces valve spool 30 in a downward direction so as to permit pressure fluid to pass from a pressure fluid reservoir 31 into the pressure chamber 32 at one end of valve spool 22a. The pressure fluid thus passed into the pressure chamber 32 moves valve spool 22a to its lowermost position in which it establishes communication between pump pressure conduit 21 and filling conduit 23b of converter 14b while closing discharge conduit 24b. In this way, converter 14b is made effective—upper or second converter velocity range. At the same time, converter 14a will be emptied through the then open discharge conduit 24a and will thus be made ineffective. When control lever 45 occupies any of the positions O and L and valve spool 22a occupies its uppermost position pertaining thereto, both converters 14a and 14b are emptied through the then opened discharge conduits and are made ineffective—idling condition of the converter transmission.

The adjustment for very low driving power is feasible only in the lower converter velocity range-converter 14a. Therefore, according to the present invention, an extension conduit 33 of outlet conduits 24a of converter 14a has interposed therein a check valve 34 with a cylindrical housing, as is particularly clearly shown on an enlarged scale in FIG. 2. Pressure chamber 35 of this check valve 34 always communicates with the interior chamber of converter 14a. The upper end face of pressure chamber 35 is formed by a valve spool 36 which is under the load of a pressure spring 37. Valve spool 36 is adapted to move in axial direction so as to control the communication between pressure chamber 35 and the conduit connection 38 leading into the oil reservoir 19. The lower end face of pressure chamber 35 is formed by a relief piston 40 likewise under the load of a pressure spring 39. Connected to relief piston 40 is a rod 41 which extends in the axial direction of said housing through presure chamber 35 and valve spool 36 and is displaceable relative to valve spool 36 in axial direction thereof. Also connected to rod 41 above valve spool 36 is a spring dish or spring keeper 42. Furthermore, a pressure spring 37 determining the opening pressure of the check valve is clamped in between spring keeper 42 and valve spool 36. The arrangement is such that pressure spring 39 always presses rod 41 upwardly, said rod, by means of sliding roller 43 engaging the particularly shaped control cam 44 which latter is tiltable by means of control lever 45. By tilting lever 45, rod 41 is axially displaced so as to adjust the pre-load on pressure spring 37. As will be evident from the above, pressure spring 37 determines the opening pressure of check valve 34 and thus also the over-pressure in converter 14a which is of the same magnitude, and more specifically at the connecting point of discharge conduit 24a with the torque converter 14a.

Relief piston 40 is, as is indicated by its name, intended to relieve torque converter pressure forces. More specifically, the force exerted by the converter pressure forces upon valve spool 36, and the force of the same magnitude but exerted upon the relief piston 40 in the opposite direction will balance each other through pressure spring 37, spring dish 42 and rod 41. As a result thereof, these forces balance each other within the check valve 34 and thus do not place a load upon the connecting linkage to drive lever 45. Moreover, those end faces of valve spool 36 and spring keeper 42 which face each other are provided with abutments 46 and 47 which rest against each other when valve spool 36 and spring dish 42 occupy a position which corresponds to the largest converter overpressure corresponding to the largest converter filling. Differently expressed, this means that from the time on when the full converter filling has been obtained, the pressure forces in the check valve are positively balanced, namely by bridging pressure spring 37, and that within this range of operation, also the check valve will remain closed even when the converter over-pressure should still further increase. This is necessary in order to assure that with normal driving operation and the converter completely filled, and with high motor speed and high driving output, the check valve will not open due to high converter pressure and will in an undesired manner reduce the transmitting power.

According to FIG. 2 showing the check valve 34 on an enlarged scale, the left portion of FIG. 2 shows check valve 34 in open condition (valve spool 36 frees conduit 38), while rod 41 occupies a position corresponding to a low over-pressure in the converter. The right-hand portion of FIG. 2 shows check valve 34 in the same position as it occupies in FIG. 1 in which the check valve has been adjusted for high converter over-pressures while connecting conduit 38 has been closed.

According to FIG. 1, control lever 45 is operatively connected not only with check valve 34 and main control valve 22 but is additionally through rods 47 and 48—which latter has an oblong hole 49—connected to a control lever 50 of a fuel pump 51 of diesel engine 10. Depending on the position of this control lever 50, the motor is adjusted for a corresponding filling and speed. For the sake of simplicity, lever 50 will be designated as fuel lever. The pulling and pressing spring 52 engaging bar 48 will in this connection always tend to hold fuel lever 50 in the illustrated position (position L/1) in which the motor runs at idling speed. The arrangement and dimensions of the control linkage, and the design of the control cams 24 and 46 are so selected that by means of control lever 45 the following conditions of operation may be obtained:

*Control lever 45 position O.*—When fuel lever 50 occupies position O, the motor is at a standstill. Point O of cams 26 and 44 is in control position so that both converters are entirely emptied (valve spool 22a in its uppermost position) and the drive is at a complete standstill.

*Control lever position L.*—When fuel lever 50 occupies its position L/1, the motor is idling. Point L of cams 26 and 44 is in control position and the torgue converters are still empty (valve spool 22a in uppermost position)—transmission in idling condition.

*Control lever position I.*—In view of the oblong hole 49, fuel lever 50 still in position L/1 while the motor is still idling. Point I of control cams 26 and 44 in control position while valve spool 22a of main valve 22 now occupies a position for filling the starting converter 14a (the same position also prevails in control lever positions II, III and 1–6).

At the same time, spring 37 of check valve 34 is adjusted for a certain slight converter over-pressure so that the excessive delivery of filling pump 20 can escape through connecting conduit 38 and the converter filling will remain low—switching operation with very low pulling force.

*Control lever positions II and III.*—Adjustment of engine 10 and main control valve the same as with control lever position I; check valve 34 is now adjusted for converter over-pressures higher than those inherent in control lever position I: switch operation with a pulling force greater than that inherent in control lever position I, but still relatively low.

*Control lever position 1.*—Motor still idling. The left-hand end of rod 47 is located just at the right-hand end of the oblong hole 49 (as illustrated). Check valve 34 is now adjusted for a converter over-pressure which corresponds to the full converter filling: the pulling force has again been increased and now corresponds to the smallest pulling force obtainable with the engine idling and the customary drive (without filling and pressure control in the converter).

*Control lever positions 2 to 6.*—Fuel lever 50 is shifted to the corresponding positions 2–6 and increases the motor filling and motor speed accordingly.

Furthermore, the arched portion of control cam 44 occupies a control position between points 1 and 6 so that check valve 34 will maintain its closing position, in conformity with the full converter filling with the converter over-pressure increasing with increasing motor speed. Check valve 34, even at very high converter over-pressure, is no longer able to open in view of the abutments 46, 47 engaging each other, and thus can no longer reduce the converter filling. Normal driving operation with medium and high pulling force and power.

Within the range of the markings I to 6, control cam 26 likewise has a circular path so that within said adjusting range, valve spool 22a remains adjusted for filling the starting converter 14a provided that the self-propelled vehicle drives within its lower velocity range. At high driving speeds, governor 29 will, as mentioned above, automatically bring about an adjustment of valve spool 22a for driving with converter 14b of the higher velocity range, while control lever 45 remains in its position.

As will be evident from the above, main valve 22 controlling the converters, and check valve 34 adapted to bring about the adjustment of the low switching power are designed as structurally separate units and are so controlled that already during switching operation, main valve spool 22a is adjusted for making the converter effective. This means that then the corresponding converter filling conduit 21, 23a is fully open, while the excessive oil will be discharged into the oil reservoir 19 through the correspondingly widely opened check valve 34. While this arrangement requires some additional structural elements, it has the advantage that, also when operating with partial filling, the maximum quantity of oil can flow from filling pump 20 through a heat exchanger 23c to the converter to exert a sufficient cooling effect. This is important, particularly when the partially filled converter is also to be used for braking purposes. In addition thereto, this arrangement yields a high degree of safety of operation.

In distinction to the above-described arrangements, it is also possible during the switching operation, to control a choke cross-section in the filling conduit of the converter for varying the quantity of filling. Furthermore, the superimposing pressure may be adjusted not only step-wise, as described above in connection with FIGS. 1 and 2, but may also be effected in a stepless manner.

FIG. 3 shows a portion of a control arrangement which is somewhat modified over that of FIGS. 1 and 2. More specifically, FIG. 3 shows the portion with the check valve 34 and its control connection to control lever 45. Those elements corresponding to elements of the arrangement of FIGS. 1 and 2 have been designated with the same reference numerals 33–47 as in FIGS. 1 and 2. The arrangement of FIG. 3 differs from that of FIG. 1 primarily in that the rod 41 is operable by a displaceable piston 60 which is reciprocable in a cylinder 61 and is under the load of a pressure spring 62 acting upon its lower end face, and is furthermore under the load of a controllable variable pneumatic pressure acting upon its upper end (pressure chamber 67). The required compressed air passes from the compressed air reservoir 63 through a conduit 64 to a pressure reducing valve 65 of any standard design. Said pressure reducing valve 65 will in conformity with a corresponding adjustment of control lever 45 through roller 43 and rod 41a, adjust the required air pressure in a conduit 66 leading to the pressure chamber 67 and in said pressure chamber 67 itself. The control is so designed that when control lever 45 occupies the driving positions I, II and III, only very low converter over-pressures will prevail at the check valve 34, whereas from position 1 on, a converter over-pressure will be obtained which corresponds at least to the full converter filling.

The arrangement of FIG. 3 is such that with increasing air pressure in pressure chamber 67 of cylinder 61, a likewise increasing converter over-pressure will be obtained. In this instance, the self-propelled vehicle can drive at high power only when the switching control is fully operable. However, a modification is also possible such that (for instance by employing a different reducing valve or a different-shaped control cam 44) with increasing pneumatic pressure in cylinder 61, the converter over-pressure will increase. In this instance, a pressure spring 62 has to be provided above the adjusting piston 60 and a pressure chamber 67 must be provided below piston 60. This arrangement has the advantage that the installation will remain operable for normal driving operation (driving operation at medium and high motor outputs) when the switching control becomes ineffective.

As will be evident from the above, the control arrangement according to the present invention has above all the great advantage that the output torque changes substantially uniformly with the adjusting strokes for adjusting the spring preload on the check valve, so that in contrast to heretofore known cross-sectional control devices, a continuous adjustment of the small output torques will be obtainable over the entire switching range. Moreover, when the output shaft is braked to a standstill and the power control member retains its position, the output torque will be constant, and in contrast to heretofore known devices of the type involved, will not drop to fractions of its original value within a short time after the shaft has been braked to a standstill.

It is, of course, to be understood that the present invention is, by no means limited to the particular constructions and arrangements set forth above, but also comprises any modifications within the scope of the appended claims.

What I claim is:

1. A driving arrangement comprising a driving motor with a relatively narrow variable speed range and a hydrodynamic transmission, especially for self-propelled rail vehicles, which includes: a prime mover, torque converter means drivingly connected to said prime mover and having fluid supply conduit means and fluid discharge conduit means for respectively conveying fluid into and discharging fluid from said torque converter means, check valve means interposed in said discharge conduit means and operable in response to a desired over-pressure in said torque converter means to move from a closing position in which it closes said discharge conduit means to an opening position in which it opens said discharge conduit means for discharging fluid from said torque converter means, control lever means movable into a plurality of positions and operatively connected to said motor for controlling the output thereof, and means operatively interconnecting said control lever means and said check valve means and operable to set the latter for opening at different over-pressures in said converter means in conformity with the respective position of said control lever means.

2. A driving arrangement according to claim 1, which includes shut-off valve means interposed in said discharge conduit means between said converter means and said check valve means.

3. A driving arrangement according to claim 1, which includes main control valve means forming a separate unit from said check valve means and being interposed between and operable to control both said fluid supply conduit means and said fluid discharge conduit means.

4. A driving arrangement comprising a driving motor with a relatively narrow variable speed range and a hydrodynamic transmission, especially for self-propelled rail vehicles, which includes: a prime mover, torque converter means drivingly connected to said prime mover and having fluid supply conduit means and fluid discharge conduit means for respectively conveying fluid into and discharging fluid from said torque converter means, check valve means interposed in said discharge conduit means and operable in response to a desired over-pressure in said torque converter means to move from a closing position in which it closes said discharge conduit means to an opening position in which it opens said discharge conduit means for discharging fluid from said torque converter means, main control valve means interposed in said fluid supply conduit means and also in said fluid discharge conduit means between said converter means and said check valve means, control lever means movable into a plurality of positions and operatively connected to said motor for controlling the output thereof, first means operatively interconnecting said control lever means and said check valve means and operable to set the latter for opening at different over-pressures in said converter means in conformity with the respective position of said control lever means, and second means operatively interconnecting said control lever means and said main control valve means for actuating the latter.

5. An arrangement according to claim 1, in which said check valve means includes spring means controlling the pressure at which said check valve means is movable from its closing to its opening position, and means operatively connected to said control lever means and operable to adjust the thrust of said spring means in conformity with the adjustment of said control lever means.

6. An arrangement according to claim 1, in which said means operatively interconnecting said control lever means and said check valve means include means for holding said check valve means closed at all converter pressures having a magnitude corresponding to at least that converter pressure which is obtained when the converter is just obtaining its maximum filling.

7. A driving arrangement comprising a driving motor with a relatively narrow variable speed range and a hydrodynamic transmission, especially for self-propelled rail vehicles, which includes: a prime mover, torque converter means drivingly connected to said prime mover and having fluid supply conduit means and fluid discharge conduit means for respectively conveying fluid into and discharging fluid from said torque converter means, check valve means comprising a housing having a first opening communicating with said fluid discharge conduit means and also having a second opening for discharging fluid from said discharge conduit means, a first piston means movable in said housing and operable to establish and interrupt fluid communication between said first and second openings and providing flow control in the intermediate positions, rod means extending through said first piston means and axially movable relative to the latter, second piston means and disc means in said housing connected to said rod means and spaced from each other in axial direction of said first piston means by a distance greater than the length of said first piston means, said first piston means interposed between said second piston means and said disc means, said first and second piston means exposed to an over-pressure in said converter means through said fluid discharge conduit means, spring means interposed between said first piston means and said disc means and biasing the first piston means in a direction for interrupting fluid communication between said first and second openings against the over-pressure in said converter means, control lever means movable into a plurality of positions and operatively connected to said motor for controlling the output thereof, and means operatively interconnecting said control lever means and said check valve means and operable to actuate said rod means to thereby set said first piston means for opening at different over-pressures in said converter means in conformity with the respective position of said control lever means.

8. An arrangement according to claim 7, in which said disc means and the adjacent portion of said first piston means have surface means facing each other, said surface means being operable to engage each other in response to the development of the maximum desirable over-pressure in said torque converter means.

9. In combination: a prime mover variable in speed within certain limits, a power transmission drivingly connected to said prime mover and including a plurality of velocity ranges and a hydrodynamic torque converter at least for the lowermost velocity range, said converter having fluid supply conduit means and fluid discharge conduit means for respectively conveying fluid into and discharging fluid from said converter, control lever means movable into a plurality of positions and operatively connected to said converter and operable to vary the degree of the over-pressure of said converter between minimum and maximum values, said control lever means also operatively connected to said prime mover for varying the speed thereof between a low and a full speed and being so designed that during a low speed of said prime mover the over-pressure of said converter will be adjusted to one value between said minimum and maximum values, said operative connection of said control lever means to said converter including adjustable check valve means interposed in said discharge conduit means and operable in response to the over-pressure in said converter, said check valve means being so designed that the latter is moved to an opening position of said discharge conduit means at different over-pressures in said converter in conformity with the respective position of said control lever means.

References Cited

UNITED STATES PATENTS

| | | | |
|---|---|---|---|
| 2,063,471 | 12/1936 | Stedefeld | 60—54 X |
| 2,997,144 | 8/1961 | Gsching et al. | 60—12 X |
| 3,055,169 | 9/1962 | Seibold et al. | 60—12 |

EDGAR W. GEOGHEGAN, *Primary Examiner.*